United States Patent [19]
Urien

[11] Patent Number: 5,228,034
[45] Date of Patent: Jul. 13, 1993

[54] RING COMMUNICATION NETWORK STATION

[75] Inventor: Pascal Urien, Villepreux, France
[73] Assignee: Bull, S.A., Paris, France
[21] Appl. No.: 844,187
[22] Filed: Mar. 2, 1992

[30] Foreign Application Priority Data

Mar. 22, 1991 [FR] France .................. 91 03530

[51] Int. Cl.⁵ .................................................. H04J 3/08
[52] U.S. Cl. ............................ 370/85.15; 370/94.1
[58] Field of Search ............... 370/55, 85.1, 85.12, 370/85.15, 94.1

[56] References Cited

U.S. PATENT DOCUMENTS

| | | | |
|---|---|---|---|
| 4,002,842 | 11/1977 | Meyr et al. | 370/85.15 |
| 4,195,351 | 3/1980 | Barner et al. | 370/85.15 |
| 4,383,315 | 5/1983 | Torng | 370/85.5 |
| 5,008,663 | 4/1991 | Adams | 370/85.15 |

FOREIGN PATENT DOCUMENTS 0354809 2/1990 European Pat. Off. .
2379953 9/1978 France .

Primary Examiner—Benedict V. Safourek
Attorney, Agent, or Firm—Kerkam, Stowell, Kondracki & Clarke

[57] ABSTRACT

A station (ST) of a multi-station ring communications network (RN), wherein data are transmitted in a predetermined direction includes a frame receiving device (DRX) for frames received from the ring, and a frame transmission device (DTX) for transmission of frames to the ring. The station (ST) further includes a FIFO repetition memory (ERPT), disposed in series between the reception and transmission devices, wherein the reception device (DRX) decides whether the frames coming from the ring should be either destroyed or repeated and subsequently sent to the repetition memory (ERPT). The transmission device (DTX) transmits the frames contained in the repetition memory or the frames proper to the station, by deciding whether the station has the right to transmit as a function of the contents of the repetition memory.

9 Claims, 4 Drawing Sheets

RING COMMUNICATION NETWORK STATION

BACKGROUND OF THE INVENTION

The present invention relates to a station belonging to a communications network in the form of a ring. More particularly, it is applicable to a network where various stations are connected to one another in series by means of a transmission medium or carrier, forming the ring, and the data are transmitted in a predetermined direction in the form of symbols (sets of bits).

Communications or data transmission networks are constituted by a plurality of units, generally called data terminal equipment, abbreviated as DTE, or "station" for the sake of linguistic simplicity. These stations communicate among one another by way of a transmission carrier, also called a transmission medium. In a network, data are transmitted over the medium as a series of frames. A frame is structured and includes beginning and end messages, synchronization signals from which a clock is derived, the address of the transmitting station, the address of the receiving station, the length of the data, the useful data, and so forth.

Among the data transmission networks most often used at present are ring networks, where the transmission carriers may be either coaxial cables or pairs of telephone wires, or increasingly frequently, optical fibers.

Regardless of the type of transmission carrier used in the ring network, a station connected to such a network has three essential functionalities:

Frame repetition: As a function of certain rules, the frames received are re-transmitted, which allows a frame to reach its destination after having passed through several stations;

Frame destruction: After having made one complete tour of the ring, the frame is destroyed by its transmitters, which avoids endless rotation of the frame over the ring;

Frame transmission: To transmit frames, some mechanism that authorizes or prohibits frame transmission at a given instant must be defined.

The operation of a network is defined by a set of rules and arrangements that make up what is commonly known as a protocol. In ring networks (also known as ring topology networks), the access protocols most commonly employed at present use the concept of a token. The token is a right to transmit. At a given instant, there is only one token on the ring. Any station that captures the circulating token accordingly keeps the right to transmit frames, preventing the others from doing so, and in that case does not repeat any frames it might receive. The right to transmit, that is, the time during which a station holds the token, is limited by a set of rules specific to the various protocols that use a token (for example, the FDDI token, an optical fiber network defined by ANSI Committee X3T9-5). At the end of transmission, the station that had captured the token lets it go. It accordingly gives up its right to transmit, thus leaving open the possibility for other stations to capture the token.

Consequently, the characteristics of a token protocol are as follows:

At a given instant, at most one station can transmit frames, or in other words gain access to the ring;

in the event that there is no exchange of data over the ring, or in other words on the condition of a zero load on it, a station must await the passage of the token before it can gain access to the ring;

the propagation time of the token on the ring is lost. In fact, during the transmit of the token from one station to another, it is impossible for a station to gain access to the ring, since this access requires capture of the token.

The consequences of the above characteristics are as follows:

Let us consider, for example, a ring having a latency (the propagation time necessary for any datum to make the complete tour of the ring) on the order of 5 ms, which for an FDDI optical fiber network corresponds to 1000 km of fiber. It is assumed that a station captures the token, transmits the frame, and then releases the token. From that time, it must then wait 5 ms before it can have the token again, even if there is no traffic whatever on the ring. This demonstrates the essential flow of token rings; The latency of the ring directly controls the frequency of access to it.

Instead of using the token concept, the station according to the invention and the ring network constituted by a set of such stations have the following qualities:

More than one of the stations according to the invention can simultaneously gain access to the ring, without collision.

In the case of a zero load, a station can gain access to the ring continuously.

Under a heavy load, the passband is distributed among the various stations, by a scheme determined in advance. This sharing may be equitable or not, depending on the users of the stations.

The ring access time is predetermined; that is, it has a maximum predetermined value.

SUMMARY

According to the invention, the station belonging to a communications network, where the various stations are connected to one another in series by means of a transmission medium, forming a ring where the data are transmitted in a predetermined direction, in the form of symbols (sets of bits), including a frame receiving device for frames coming from the ring, and a frame transmission device for transmission to the ring, is characterized in that it further includes, a FIFO repetition memory disposed in series between the reception and transmission devices; the reception device decides whether the frames coming from the ring should be either destroyed, or repeated and then sent to the repetition memory; the transmission device transmits the frames contained in the repetition memory or the frames proper to the station, by deciding whether the station has the right to transmit as a function of the contents of the FIFO memory.

BRIEF DESCRIPTION OF THE DRAWINGS

Further characteristics and advantages of the present invention will become apparent from the ensuing description, given by way of non-limiting example, in conjunction with the accompanying drawings.

In these drawings.

DESCRIPTION OF THE PREFERRED EMBODIMENTS

Figure 1:
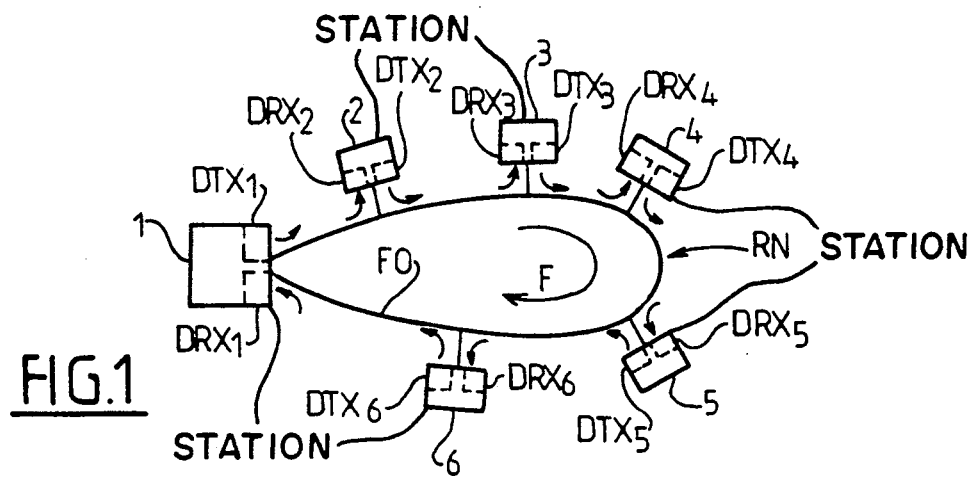
FIG. 1 schematically shows how a ring-type communications network is constituted.

Turning now to FIG. 1, a network RN in the form of a ring including six stations 1-6, for example, disposed in series, is shown. These stations are connected to one another by means of a transmission medium, for example made of optical fibers, marked FO. The data are transmitted over the ring in a predetermined direction, for example represented by the arrow F in FIG. 1.

Each station includes a reception device, that is, the device $DRX_1$ for station 1, $DRX_2$ for station 2, and so forth, and DRX6 for station 6.

Similarly, each station includes a device for transmitting data to the ring, that is, the transmission device $DTX_1$ for the station 1, $DTX_2$ for station 2, and so forth, and DTX6 for station 6. Thus the data transmitted via the transmission device $DTX_1$ from station 1 are sent via the fiber FO to the reception device $DRX_2$ of station 2. As has been noted above, the frames received by the reception device $DRX_2$ are either re-transmitted by the transmission device $DTX_2$, by the rules and protocols used on the ring RN, or destroyed, if they have made one complete tour of the ring (in that case, it is obvious that these data will have been transmitted by the transmission device $DTX_2$). The same situation is apparent for the other stations 3, 4, 5 and 6.

Each frame is constituted by the succession of the following symbols:

SD: This symbol delimits the beginning of a frame (SD stands for "start delimiter").

IDT: This symbol is used to detect any frame that is lost on the ring.

DA: This symbol indicates the address of the destination station of the frame (DA stands for "destination address").

SA: This symbol indicates the address of the frame transmitter (SA stands for "source address).

DATA: This is the field containing all the useful information of the frame.

ED: This symbol delimits the end of a frame (it stands for "end delimiter").

Accordingly, in the order of transmission, one frame is constituted by the succession of the following symbols:

SD   IDT   DA   SA   DATA   ED

With the exception of the symbol IDT, which is specific to the frames sent by any station according to the invention, the other symbols are known and are used in most of the known networks, such as token ring or FDDI networks.

The absence of a frame is indicated by a succession of specific symbols, called "IDDLE". Such symbols are obligatorily transmitted by every station that has no specific frame to either transmit or repeat. They are known and are used in most of the networks of the prior art.

The data frames are separated by the symbols IDDLE, so that the general scheme of the succession of symbols circulating on the ring RN is as follows:

SD . . . ED   IDDLE . . . IDDLE   SD . . . ED and so forth.

Figure 2:
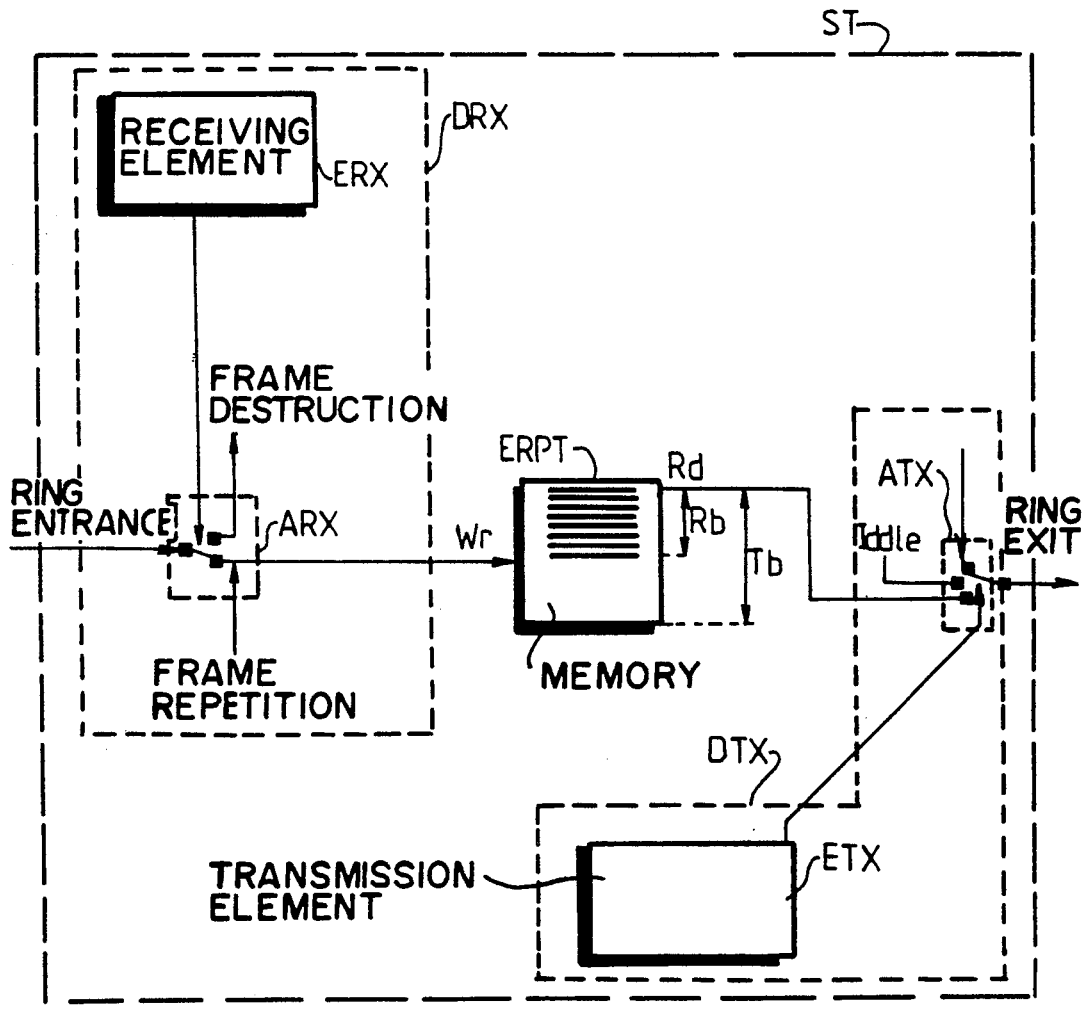
FIG. 2 shows the essential constituent elements of a station according to the invention.

The essential constituent elements of the station ST according to the invention are shown in FIG. 2. In order, they are the reception device DRX, the repetition element ERPT, and the transmission device DTX.

The reception device DRX includes two essential parts, that is, a reception element ERX and a switching device ARX. The latter is physically connected to the transmission medium of the ring RN (it is assumed here that the ring RN is identical to that of FIG. 1 and that the transmission medium is for instance constituted by an optical fiber) and is commanded by the reception element. The latter examines the symbols constituting each frame coming from the ring and as a function of this examination decides whether the frame in question is to be destroyed or repeated. If the frame is to be destroyed, the switching device ARX sends it to a frame destruction device DDT that is also part of the reception device DRX, shown in FIG. 3. If the frame is to be repeated by the station SD, then the corresponding symbols are transmitted by the switching device ARX to the repetition element ERPT.

The repetition element ERPT memorizes the symbols of each frame that are to be repeated by the station ST. Preferably, it is constituted by a FIFO memory, the writing of which is managed by the reception device DRX (and more specifically by the reception element ERX), as represented by the presence of the symbol Wr (for "write") in FIGS. 2 and 3, present on the linking line between ARX and ERPT, and reading is managed by the transmission device DTX (and more specifically by a transmission element ETX), the role of which will be described in further detail hereinafter), which is represented by the presence of the symbol Rd (for "read") in the same figures, on the line connecting ERPT to ATX (see below).

The symbol Wr in fact corresponds to the address of the memory zone of the repetition FIFO where the frames to be repeated by the station ST are to be written, and the symbol Rd corresponds to the address of the zone where the frames to be repeated, and meant to be transmitted by DTX, are to be read. These addresses are furnished by internal counters in DRX and DTX, which may be constituted either as hardware elements or as software pointers.

The transmission device DTX transmits either the symbols contained in the element ERPT, in the case where the station repeats the frame that it has received, or transmits the symbols proper to the station itself. The essential components of this transmission device are a transmission element ETX and a switching element ATX, the latter connected to the ring RN and commanded by the element ETX. This switching device ATX is also connected to the output of the repetition element ERPT.

Figure 3:
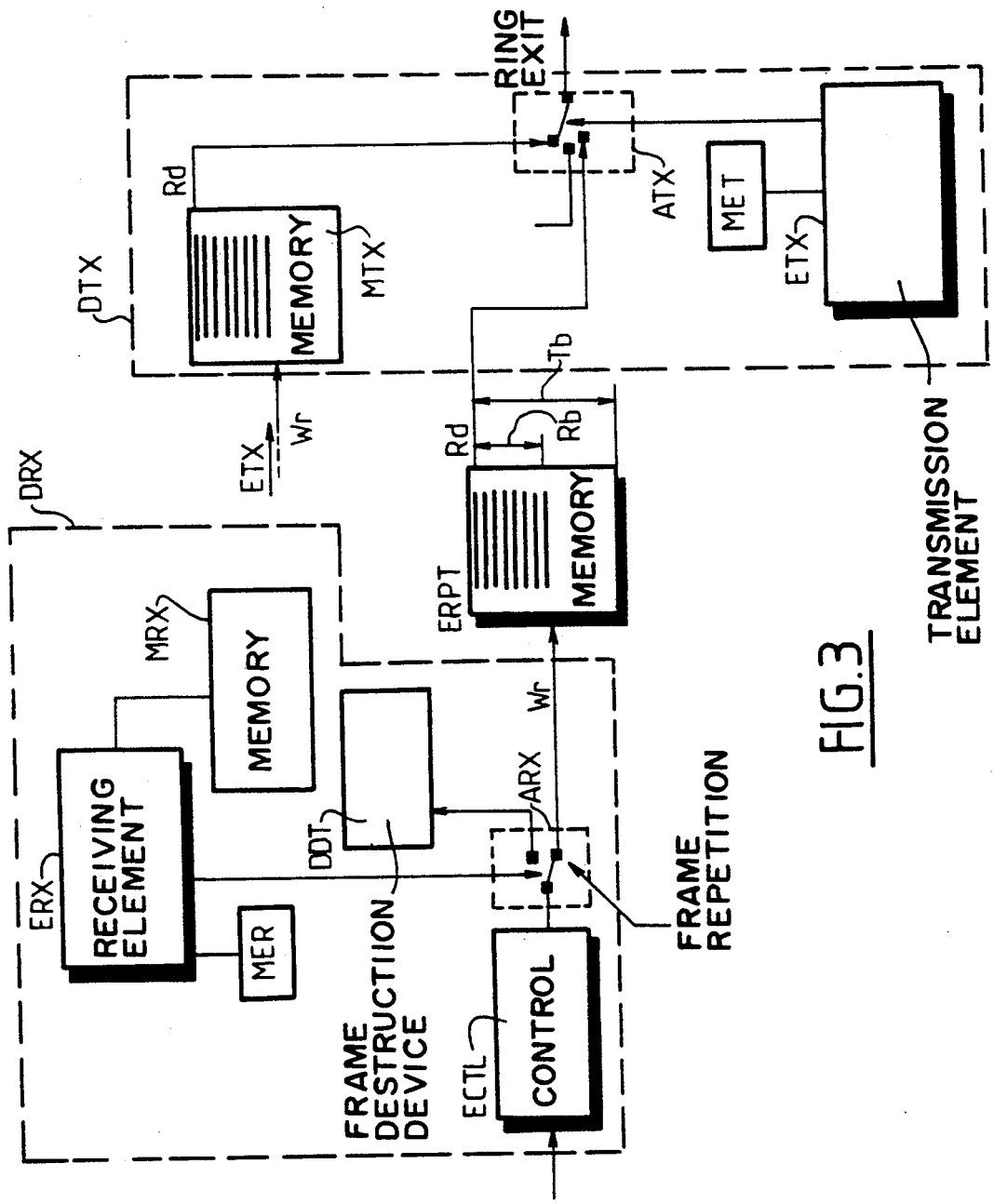
FIG. 3, in more detailed fashion than FIG. 2, shows all of the constituent elements of a station according to the invention.

Turning now to FIG. 3, the set of components of the station according to the invention shown in FIG. 2 is shown in greater detail.

The reception device DRX includes, in addition to the elements already mentioned, that is, the reception element ERX, the switching device ARX and the frame destruction device DDT, a reception buffer memory MRX and a control element ECTL. There is only one of this latter element on the ring, so that it is accordingly common to all the stations of the network RN. It assures the destruction of any frames that might be lost: Hence it prevents a frame that had mistakenly not been destroyed by one of the stations of the network from making a second tour around the ring. Hence it is a security device proper to the ring and shared by all the stations. The reception device DRX also includes a state machine MER commanded by the reception element ERX.

The reception element ERX is preferably constituted by a functional logic that decides whether each frame entering the station must be repeated by it or not. For this purpose, the element ERX examines the set of symbols, constituting the frame, identifies them, and as a function of their nature decides whether the frame must be repeated or not. ERX also performs the recopying of each of the frames addressed to the station ST itself. This recopying is done in the buffer memory MRX. It is appropriate when the symbol DA is equal to the address proper to the station ST. This address proper to the station is designated by the symbol MA. Hence recopying of the frame addressed to the station in the buffer memory MRX takes place when DA = MA.

The frames addressed to the station, which are recopied in MRX, must also be repeated (and hence sent to ERPT) so that the station that has transmitted them will retain the capability of destroying them and hence preserving its right to transmit (see the definition of the right to transmit in the text below).

The repetition algorithm that enables the reception element ERX to decide whether or not a frame received by the station ST is to be repeated, and if so sent by way of the switching device ARX to the repetition FIFO ERPT, is as follows:

If the symbol SD is simultaneously present and the symbol SA differs from MA (which means that the address of the station to which the frame is addressed is different from the address proper to the station ST), as long as the symbol SD is a valid symbol, then the set of symbols constituting the frame received is repeated. These are then sent to the repetition FIFO ERPT.

It will be recalled that a symbol is valid when its meaning within the frame received is known, or if it is known to exist in the protocol used on the ring RN. The element ERX knows the definition of all the symbols used in this protocol, because they are for instance listed in a table internal to that element. Hence ERX can determine from this fact whether or not a symbol is valid.

The reception device DRX (and consequently the functional logic constituting the reception element ERX) accordingly has only two possible states contained in the state machine MER. These two states are as follows:

State $E_1$: This state, called RX-REPEAT, is the one where a frame such as SA different from MA is detected. The flow of symbols constituting the frame received by the station ST is then steered by way of ARX to the repetition FIFO ERPT. In that case, the signals constituting the frame are reshaped and regenerated by a reshaping device (known and used in all the stations of the networks according to the prior art), which is not shown, in order to simplify FIGS. 2 and 3. This reshaping takes place before the signals arrive at ERPT.

State $E_2$: This state, called RX-RELEASE, is the one where the flow of symbols corresponding to the frame that arrives at the station ST is withdrawn from the network. This is true for the frames where SA is equal to MA, and it is also true for all the symbols IDDLE. The frame is destroyed by DDT, by simply not being sent to the reshaping device and henceforth not regenerated, and is accordingly lost.

The above description, in terms of the definition of the states $E_1$ and $E_2$, is supplemented by Table I in the appendix at the end of the specification, which shows the change from state $E_1$ to state $E_2$, and vice versa. Thus a change from state $E_2$ to state $E_1$ takes place when SD is valid and simultaneously SA differs from MA.

In turn, a change from the state $E_1$ to the state $E_2$ takes place when a symbol IDDLE has been detected or when SA=MA.

The state machine MER that memorizes the states $E_1$ and $E_2$ may for example be constituted by a specific integrated circuit, or by a microprocessor programmed for that purpose (monolithic microprocessor Z-80, made by SGS-Thomson).

The repetition element ERPT then memorizes the symbols constituting each frame to be repeated, which are furnished by the device DRX via ARX when the state machine MER is in the RX-REPEAT state.

When the station ST is not transmitting its own frames, the symbols present in the repetition FIFO are re-transmitted over the ring by the transmission device DTX. In that case, the contents of the repetition FIFO remain stable (that is, the number of symbols contained in this FIFO remains constant) if the state machine MER is in the state $E_1$, that is, RX-REPEAT. This signifies that the number of signals re-transmitted by the station, by way of the device DTX, is equal to the number of symbols entering the memory FIFO coming from the ring, the latter symbols being intended to be repeated themselves. Contrarily, when the state machine MER is in the state $E_2$, that is, RX-RELEASE, the contents of the repetition FIFO decrease (the number of symbols contained in it decreases), since the symbols that are transmitted by the station and which were contained in the repetition FIFO are not replaced with an equivalent number of symbols coming from the ring, the latter having been destroyed, or being IDDLE symbols.

When the transmission device DTX of the station ST is transmitting its own frames, the repetition FIFO then memorizes symbols that will later be repeated on the ring (after the station has stopped transmitting its own frames).

Aside from the elements mentioned above, that is, ETX and ATX, the transmission device DTX also includes a buffer memory MTX and a state machine MET. The buffer memory MTX is connected to the switching device ATX and is commanded by the transmission element ETX. It contains the set of symbols of the frames intended to be transmitted by the station ST on its own. The state machine MET includes three states $E_3$, $E_4$, $E_5$, which will be defined hereinafter in conjunction with the description of the operation of the transmission device DTX. It is connected to the transmission element ETX. The constitution of MET is the same as that of MER.

Under the command of the transmission element ETX, the transmission device DTX may, by way of the switching device ATX, transmit either its own frames contained in the buffer memory MTX or IDDLE symbols, or it may repeat the frames that the reception device DRX has received, coming from the ring RN and stored temporarily in the repetition FIFO ERPT.

The transmission element ETX is the fundamental element of the transmission device and consequently, of the entire station according to the invention. It is this element that decides on the right to transmit of the station, under the conditions defined below:

At any given instant, whether or not the station is seeking to transmit, the quantity of symbols contained in the repetition FIFO ERPT is equal to $R_b$. When this quantity is less than or equal to a predetermined value T-Pri, the right to transmit is then $T_b$-$R_b$, where $T_b$ is equal to the depth of the repetition FIFO, that is, the maximum quantity of symbols that it can contain. $T_b$ then also represents the maximum authorized transmission time: Indeed, it should be stated that a predetermined traffic time on the ring corresponds to a predetermined quantity of symbols. Hence a traffic time is associated with a symbol containing a predetermined number of bits, which is the same regardless of the type of symbols; this is because the output on the ring is known and is perfectly constant, for example being on the order of several megabits per second. $T_b$ accordingly is quite representative of both a maximum quantity of symbols and a maximum authorized transmission time.

When the station ST gains access to the network at a predetermined moment, the quantity of symbols present in the repetition FIFO is designated by the symbol Q-lock. Thus, it is apparent that Q-lock = $R_b$ This quantity is memorized by the transmission element ETX, which also knows the quantity $T_b$. The station then transmits a maximum number of symbols ($T_b$ − Q-lock). Once the station has transmitted this maximum number of symbols, it can repeat the symbols contained in the repetition FIFO during the time Q-lock, which guarantees the circulation of the frames on the ring.

It will be recalled that a FIFO is provided with pointers that permanently indicate their fill state, this information being permanently communicated to the transmission element ETX. Hence, Q-lock is always known to ETX.

As a function of the above, it can be seen that the repetition FIFO is not emptied when the station ST transmits. The latter cannot transmit unless free spaces remain in the FIFO, at the moment when it decides to transmit (the quantity is $T_b$ − Q-lock).

Moreover, if the repetition FIFO is completely full at a given moment, it must be capable of emptying itself in such a way as to permit the station to transmit later. This capability of the FIFO to empty itself is guaranteed by the fact that what has been transmitted by the station ST will be destroyed by DRX, once the set of symbols transmitted returns to it (see above). It can thus be seen that the mechanism that rules the operation of the station according to the invention is self-regulating, because as many symbols as have been transmitted are destroyed, and the repetition FIFO is emptied of as many symbols.

In conclusion, it is clear that it is the rate at which the repetition FIFO is filled that determines the right of the station to transmit.

In the particular case where the predetermined value T-Pri has been selected to equal 0, the station has access to the ring when the repetition FIFO is emptied (because $R_b$=0 in that case). Let us then assume that it is empty at a given instant. The station then obtains the right to transmit for a maximum time period $T_b$. During the transmission, the possible symbols to be repeated are memorized in the repetition FIFO. If the ring is at saturation (in that case, the state machine MER of DRX is in the state $E_1$), the repetition FIFO will remain non-empty until the return of all the frames that had been transmitted (in that case, SA=MA), which brings about the change of state of MER: A change is made from the state $E_1$ to the state $E_2$, which makes the FIFO empty again, since all the frames transmitted are destroyed.

In the case of a lesser load on the ring, it is the reception of a sufficient number of IDDLE symbols that permits purging the repetition FIFO, because nothing more enters it, and so transmission can take place.

The state machine MET of the transmission device DTX includes three states: $E_3$, $E_4$, $E_5$:

State $E_3$: In this state, called TX-IDDLE, the station ST transmits the symbols IDDLE, which arise on the one hand if there is no symbol to be transmitted or repeated, and on the other upon the detection of the end of a frame, performed by the reception element ERX.

State $E_4$: In this state, called TX-DATA, the station ST transmits its own frames on the ring; any possible symbols to be repeated are then memorized in the repetition FIFO ERPT.

State $E_5$: In this state, called TX-REPEAT, the station ST reads the symbols contained in the repetition FIFO and retransmits them over the ring RN.

The way in which a change is made from one of the states $E_3$, $E_4$ and $E_5$ to another is summarized in Table II, which appears in the appendix at the end of the specification, and is done under the conditions defined below after the following definitions are given:

The internal flag of the state machine MET, called lock-tx, is a flag that does or does not prohibit the transition from the state $E_3$ to the state $E_4$, depending on whether it is TRUE or FALSE (depending on whether its logical value is 1 or 0). Thus, since this flag is TRUE, a transition from the state $E_3$ to the state $E_4$ is impossible.

The flag called "flag-tx", which is also internal to the state machine MET, indicates whether the station ST is or is not currently transmitting its own frames. Thus if this flag is in the TRUE state (logical value equal to 1, for instance), then this means that the station ST is currently transmitting its own frames. Similarly, if this flag is in the FALSE state (logical state equal to 0, for instance), the station ST is not currently transmitting its own frames.

To change from state $E_3$ to state $E_4$, it is accordingly necessary that on the one hand the "lock-tx" flag be in the FALSE state, and on the other, either $R_b$ is less than or equal to T-Pri, or "flag-tx" is in the TRUE state. At the beginning of transmission by the station ST, the following situations pertain:

Q-lock=$R_b$, flag-tx=TRUE

Te-Max=($T_b$−$R_b$), where Te-max is the maximum right for transmission at the beginning of the transmission.

At the end of the transmission of the set of all the frames, the following situation pertains:

flag-tx=FALSE

If Q-lock differs from 0, then lock-tx=TRUE.

To change from the state $E_4$ to the state $E_3$, at the end of the transmission of each frame, it suffices to have detected the symbol ED (detection by the element ETX).

To change from state $E_3$ to state $E_5$, the following conditions must be combined: First, the flag flag-tx must be in the state FALSE, and second, the repetition FIFO ERPT must not be empty, that is, it must have Q-lock different from 0. Once one is in the state $E_5$ (TX-REPEAT), at the end of the transmission of every frame that is repeated, then if the flag lock-tx is in the TRUE state, then the quantity Q-lock of the number of symbols that have been repeated is decremented. In the case where Q-lock $=0$, then the flag lock-TX is in the FALSE state. To change from state $E_5$ to state $E_3$, it is then necessary either to detect an end of frame delimiter ED (at the end of each frame repeated), or for the repetition FIFO to be empty.

It is clear that one cannot pass directly from state $E_4$ to state $E_5$, or vice versa, since the frames are always separated by the symbols IDDLE, and so it is necessary to pass by way of state $E_3$ in order to go from $E_4$ to $E_5$, and vice versa.

The control element ECTL is a particular unique element on the ring, which prevents any frame from making more than one tour of the ring. It is described here as being part of the station ST (since it is part of the device DRX), but it is apparent that in that case, only the station ST is provided with ECTL, while the other stations on the ring then accordingly have no such element.

Each frame is transmitted on the ring with an identification field IDT, which is then defined as being equal to RESET (which in the exemplary embodiment described here corresponds to a logical value equal to 0). As soon as its receives a frame, the element ECTL assigns the field IDT a value, called SET (corresponding to a logical value of 1, in the exemplary embodiment described here), and then repeats the frame that it sends to the other stations. In return, it destroys all the other frames the field IDT of which is equal to SET. It is accordingly impossible for one frame to pass through the control element twice. The state machine of the control element, which is not shown in order to simplify FIG. 3, is described as follows: It enables passage from state $E_6$ to state $E_7$, and vice versa.

In state $E_6$, also called ECTL-IDDLE, the control element transmits the IDDLE symbols.

In state $E_7$, also called ECTL-REPEAT, the control element repeats the frames that it receives.

The change from $E_6$ to $E_7$ and vice versa is illustrated by Table III, which is found in the appendix at the end of the specification.

To change from state $E_6$ to state $E_7$, the frame received by the control element ECTL must include a valid symbol SD, and the identification field IDT must also be in the RESET state. ECTL then puts the identification field IDT in the SET state.

To change from state $E_7$ to state $E_6$, it suffices to detect an IDDLE symbol.

When a valid symbol SD and an identification field IDT=SET are simultaneously present, then state $E_6$ persists, and the control element then destroys the frame received.

Turning now to FIGS. 4–8, the operation of a network RN incorporating stations according to the invention are shown in more detailed fashion.

First, how the transmission medium is shared among each of the stations, such as ST, each station carrying the reference letter i, will be examined.

The case addressed will be that in which the ring RN is saturated, that is, in which each station of the network is attempting to gain access continuously to the transmission medium.

The symbol tpd stands for the propagation time of the ring, and Tbi, where $1 \leq i \leq n$, where n is the number of stations of the network, stands for the maximum transmission rights of the stations. Accordingly, Tbi is the depth of the repetition FIFO of the station identified by the letter i.

The maximum quantity of symbols in transit on the ring is accordingly equal to the sum of the maximum transmission rights of all the stations, plus the propagation time of the ring; that is:

$$Q\text{max} = tpd + \sum_1^n tbi$$

In fact, corresponding to the time tpd is a number of symbols that can be considered to be "memorized" by the transmission medium, this number corresponding to what has been memorized before the FIFOs were filled; accordingly, these are symbols memorized from outside the FIFOs in the medium, which can henceforth be considered as a FIFO of a particular type.

The symbols present on the ring have been transmitted by the various stations i. If Qi is the number of symbols that has actually been transmitted by each station i, then:

$$Q\text{max} = \sum_1^n Qi$$

Before the complete saturation of the ring, a certain number of IDDLE symbols is in circulation. The capture of these symbols increases the right of each station to transmit, because those symbols not steered to the repetition FIFO of the corresponding stations are destroyed by the reception device.

The number of symbols IDDLE circulating on the ring is, in any state in question, less than TPD; hence:

$$\Sigma \text{IDDLE} < tpd$$

As a result, the quantity of total symbols transmitted by one station can be greater than Tbi, since the station can recover a certain number of IDDLE symbols in transit on the ring. Hence:

$$Qi = Tbi + ei \times tpd$$

wherein:

$$\sum_1^n ei = 1$$

The term (ei $\times$ tpd) results from the capture of a certain number of IDDLE symbols by the station i.

The fraction $\rho$ i of the available passband at a station i can accordingly be written as follows:

$$\rho i = (Tbi + ei \times tpd) / \left( tpd + \sum_1^n Tbi \right)$$

this passband fraction being equal to Qi/Qmax.

It is seen that the propagation time of the ring appearing in the numerator and denominator of the preceding fraction is randomly distributed among the various stations of the network.

This phenomenon will be better understood in conjunction with FIGS. 4-8, where the ring is assumed to include two stations A and B.

Figure 4:
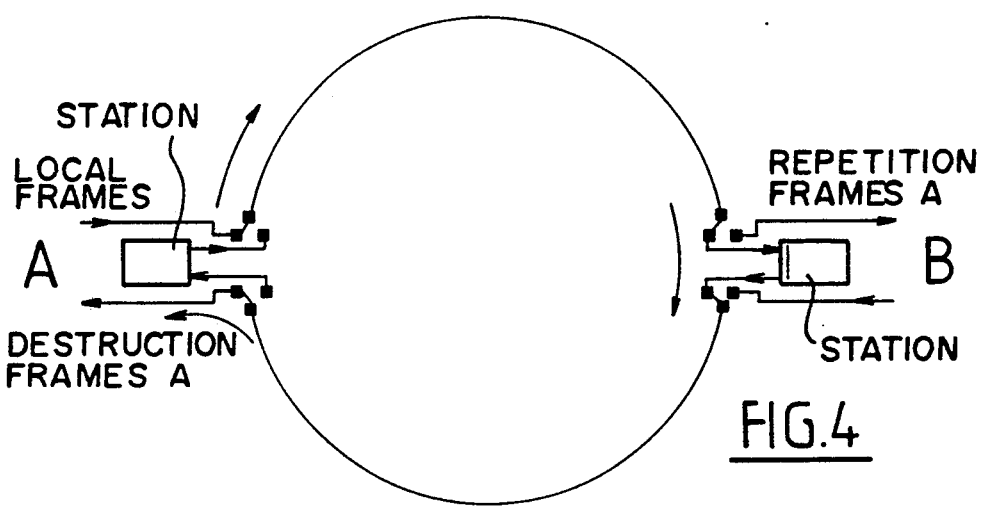
FIGS. 4-8 illustrate the operation of a network incorporating two stations according to the invention.

Turning to FIG. 4: Station A has permanent access to the ring. Station B makes no request for transmission and permanently repeats the frames originating in station A. The repetition FIFO of station A remains empty, since the frames coming from the ring are not repeated, since station A destroys the frames it had previously transmitted and which had been repeated by station B. The repetition FIFO of B remains empty, since the latter repeats the frames transmitted by A and does not transmit any of its own.

It is thus seen that the two repetition FIFOs of stations A and B remain empty in FIG. 4.

Figure 5:
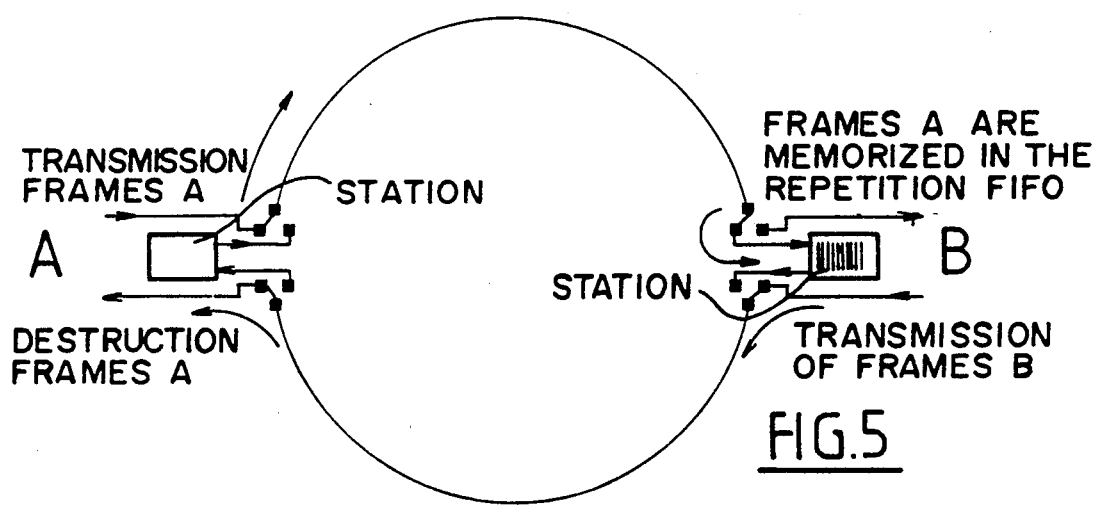

Turning to FIG. 5: At this instant, which can be defined as time t=0, the repetition FIFO of station B is empty. The latter accordingly has a right of transmission Tb (depth of the FIFO of B). Stations A and B then accordingly transmit frames simultaneously. The frames A are memorized in the repetition FIFO of B. B transmits its own frames, while A, while continuing to transmit its own frames, continues to destroy the frames that it had previously sent.

Figure 6:
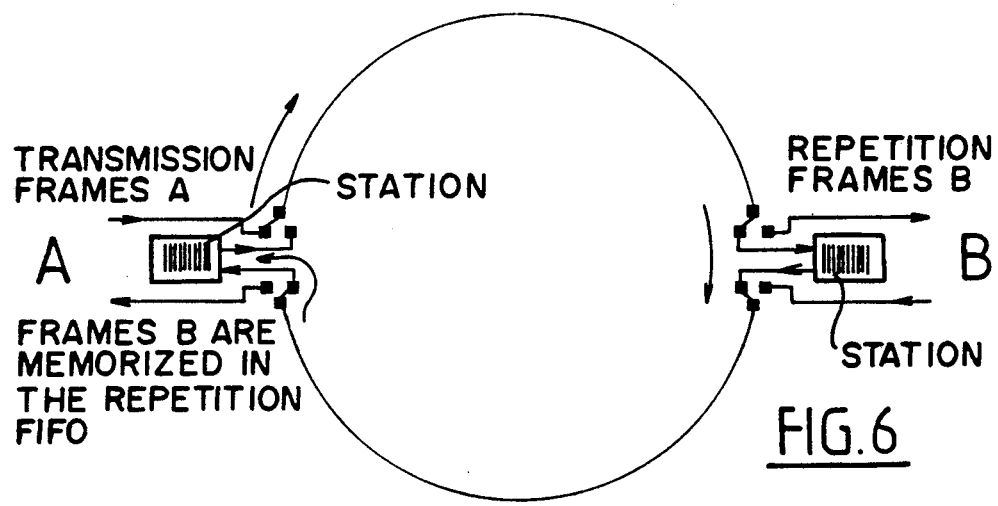

Now turning to FIG. 6: Let $tpd_1$ be the propagation time from B to A. At time $tpd_1$, the first frame B reaches station A. It is assumed at the same time that A simultaneously inhibits a transmission of duration $T_b$, the FIFO of A then being empty at that instant. At time $t_1 = tpd_1 + T_b$, the repetition FIFO of A contains the quantity $T_b$ of symbols sent by B. As of then, local transmissions from A are no longer possible, since the right of transmission is 0 ($R_b$ being equal to $T_b$, and hence the difference $T_b - R_b$ is 0). The repetition FIFO of B contains a quantity of symbols $T_b$ originating in A. The station B that has just transmitted its own frames can then nevertheless repeat the frames transmitted by A.

Figure 7:
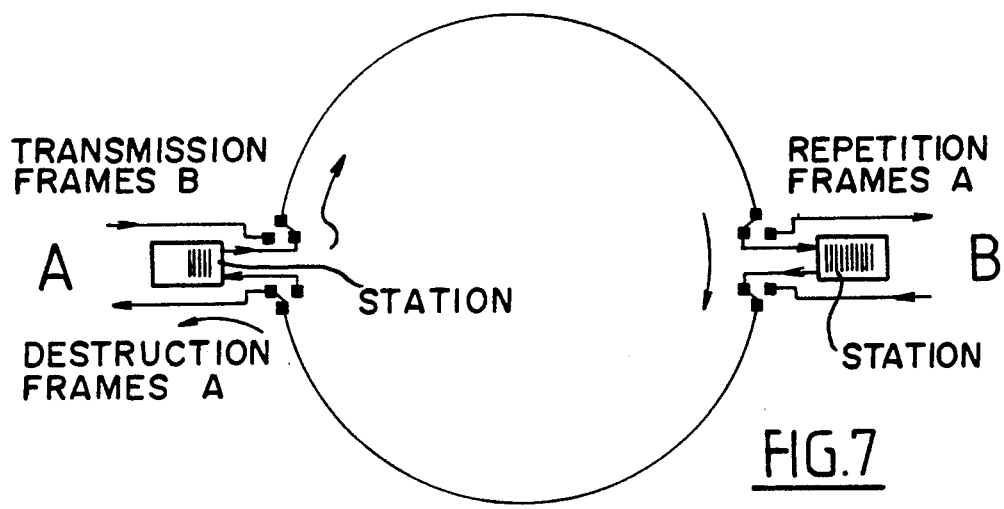

Turning now to FIG. 7: At time $t_1$ defined above, the repetition FIFO of A is full, so that station re-transmits the symbols originating in B and continues to destroy the frames that it had previously sent. Consequently, the number of symbols contained in the FIFO of A decreases.

In the same time period, the contents of the FIFO of B remain equal to $T_b$. Accordingly, B can repeat the symbols originating in A.

Figure 8:
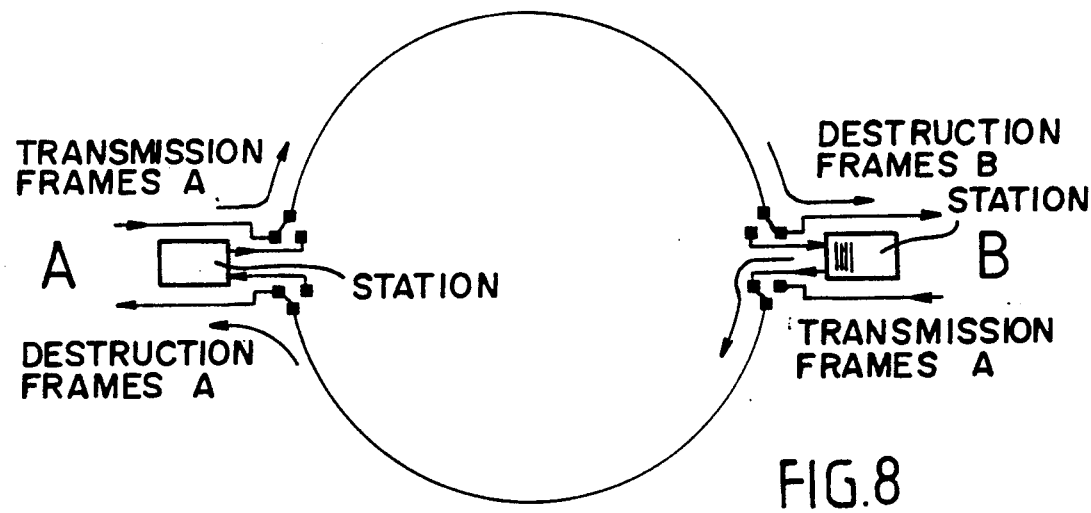

We will now turn to FIG. 8.

If $tpd_2$ is the propagation time of A to B, at time $t_2 = tpd_1 + tpd_2 + 2T_b$, B has destroyed the quantity $T_b$ of symbols previously sent. Its FIFO is henceforth empty, which authorizes it once again to gain access to the ring.

The passband fraction available for A is accordingly as follows:

$$pA = (T_b + tpd)/(tpd + 2T_b),$$

because initially, there is only a number tpd of symbols sent by A over the medium, hence ei=1 for station A, while the passband fraction available for B is as follows:

$$pB = T_b/(tpd + 2T_b),$$

because the maximum total quantity of symbols at saturation is:

$$2T_b + tpd, and pA + pB = 1.$$

It is seen that the symbols that move over the medium are either shared by all the stations or possessed by a single station, depending on the history that has occurred over the ring; hence equitable sharing of the ring among stations cannot be guaranteed; accordingly, this sharing is actually pseudo-random.

APPENDIX

TABLE I

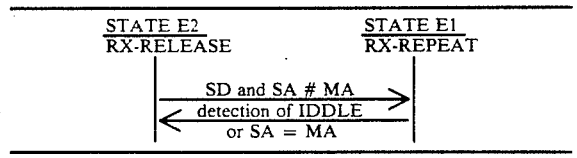

TABLE II

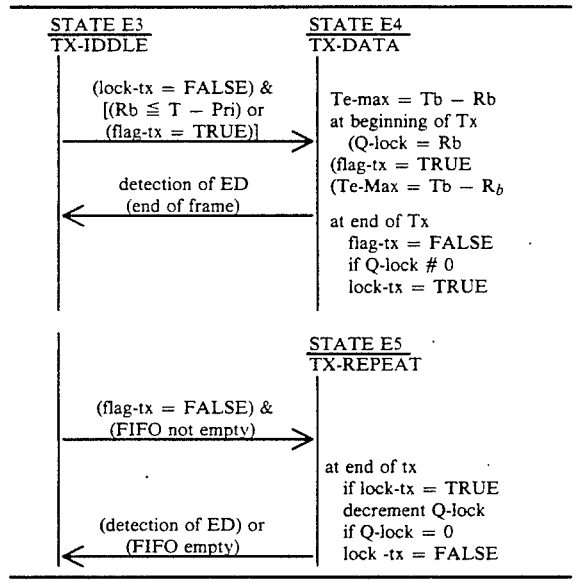

TABLE III

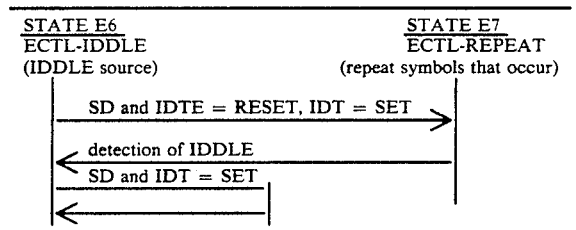

I claim:

1. A station (ST) of a multi-station ring communication network (RN), wherein the stations are connected to one another in series forming a ring, by means of a transmission medium (FO), and wherein data are transmitted between stations in a predetermined direction, the data being in the form of symbols (IDDLE, SE, IDT, etc.), each station including frame receiving means (DRX) for receiving frames from the ring,
frame transmission means (DTX) for transmission of frames to the ring, the invention characterized in that the station comprises a first in first out (FIFO) repetition memory (ERPT) disposed in series between the receiving means (DRX) and transmission means (DTX), said receiving means (DRX) including means for deciding if the frames received from the ring are to be destroyed or repeated and subsequently transferred to and written into the repetition memory (ERPT), and said transmission means (DTX) including a switching device (ATX) connected to the ring and to the repetition memory, a transmission element (ETX) commanding the switching device and including means for determining the right of the station to transmit by calculating the difference between the maximum quantity of symbols that the repetition memory can contain and the quantity of symbols contained in the repetition FIFO (ERPT) at a given moment.

2. The station (ST) of claim 1, characterized in that the frame receiving means (DRX) includes a receiving element (ERX) and a switching device (ARX) connected to the ring (RN) and to said receiving element for examining the symbols of each frame received from the ring and as a function of this examination deciding whether the frame in question should be either destroyed or repeated.

3. The station (ST) of claim 2, characterized in that the frame reception means (DRX) further includes frame destruction means (DDT) connected to the switching device (ARX), for destroying the frames received from the ring on the decision of the receiving element (ERX) to destroy the frame in question.

4. The station (ST) of claim 3, characterized in that it further includes a reception buffer memory (MRX) connected to the receiving element (ERX), said buffer memory adapted to receive the symbols of each of the frames sent to the station (ST) via the receiving element (ERX).

5. The station (ST) of claim 2, characterized in that it further includes a reception buffer memory (MRX) connected to the receiving element (ERX), said buffer memory adapted to receive the symbols of each of the frames sent to the station (ST) via the receiving element (ERX).

6. The station of claim 1, characterized in that the transmission element (ERX) is operative to organize the transmission of either the symbols contained in the memory element (ERPT), in the case where the station decides to repeat the frame received, or own emitted station frames.

7. The station of claim 1, characterized in that the transmission means (DTX) also includes a buffer memory (MTX) connected to the switching device (ATX) and commanded by the transmission element (ETX), which includes the set of symbols of the frames to be transmitted by the station (ST).

8. The station of claim , 1 characterized in that the transmission means (DTX) also includes a buffer memory (MTX) connected to the switching device (ATX) and commanded by the transmission element (ETX), which includes the set of symbols of the frames to be transmitted by the station (ST).

9. The station (ST) of claim 1, characterized in that the frame receiving means (DRX) includes a receiving element (ERX) and a switching device (ARX) connected to the ring (RN) and to said receiving element for examining the symbols of each frame received from the ring and as a function of this examination deciding whether the frame in question should be either destroyed, or repeated and transferred to the reception memory ERPT, and a frame destruction means (DDX) connected to the switching device (ARX) for destroying a number of symbols equal to the number of symbols emitted by transmitter means (DTX).

* * * * *

UNITED STATES PATENT AND TRADEMARK OFFICE
CERTIFICATE OF CORRECTION

PATENT NO. : 5,228,034
DATED : July 13, 1993
INVENTOR(S) : Pascal URIEN

It is certified that error appears in the above-indentified patent and that said Letters Patent is hereby corrected as shown below:

Column 14, line 10 (Claim 6, line 2) "(ERX)" should be --(ETX)--.

Signed and Sealed this

Twenty-fourth Day of May, 1994

BRUCE LEHMAN

*Attest:*

*Attesting Officer*     *Commissioner of Patents and Trademarks*